Patented Dec. 15, 1936

2,064,315

UNITED STATES PATENT OFFICE 2,064,315

PREPARATION OF THIAZTHIONIUM CHLORIDES

Wendell P. Munro, Bound Brook, and Hans Z. Lecher, Plainfield, N. J., assignors to The Calco Chemical Company, Inc., Bound Brook, N. J., a corporation of Delaware No Drawing. Application June 20, 1935,
Serial No. 27,536

12 Claims. (Cl. 260—44)

This invention relates to the preparation of thiazthionium chlorides.

In the past, thiazthionium chlorides have been prepared by reacting primary aromatic amines having at least one free hydrogen ortho to the amino group with sulfur monochloride. The thiazthionium chlorides can be hydrolyzed to the corresponding orthoaminothiophenols which compounds are useful as intermediates for the production of thionaphthene dyestuffs. The thiazthionium chlorides have the one or other of the following formulae:

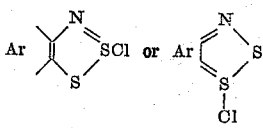

The Ar refers to the remainder of the aromatic nucleus. The amines have been used mostly in the form of their salts, particularly hydrochlorides, and it has been stated that if free amine bases or acidylamines such as acetanilide are used as starting materials, they are converted into the corresponding hydrochlorides in the first phase of the reaction. The reaction proceeds according to the following equation:

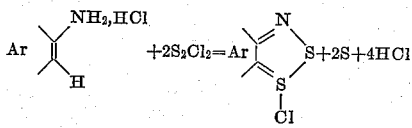

In some cases, the aromatic nucleus is also chlorinated as shown in the following equation:

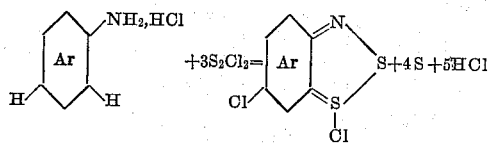

This process is wasteful of sulfur monochloride, requiring at least 2 or 3 moles of sulfur monochloride and normally requiring a large excess to give acceptable yields.

The present invention provides a new method of preparation in which one molecule of the reacting $S_2Cl_2$ is replaced by thionyl chloride ($SOCl_2$). The total reaction may be represented by the following equation:

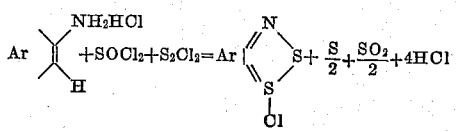

This equation has been proved in several cases when only 1 molecule $S_2Cl_2$ and 1 molecule $SOCl_2$ were used for each molecule amine and high yields of thiazthionium chloride were obtained; if $S_2Cl_2$ had reacted alone, not more than 50% yield could have been obtained. Of course, in cases where chlorination of the aromatic nucleus takes place, another molecule of $S_2Cl_2$ is required here also. We have found that the reaction actually proceeds in steps. Thionyl chloride reacts with primary aromatic amine hydrochlorides to form a thionylamine according to the following reversible equation:

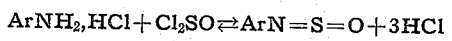
$$ArNH_2,HCl + Cl_2SO \rightleftarrows ArN=S=O + 3HCl$$

This process is reversible: if at higher temperature hydrogen chloride is given off, the thionyl compounds are formed in almost quantitative yield; if at lower temperature these thionylamines are treated with hydrogen chloride, they are split into the hydrochloride of the base and thionyl chloride. If an aromatic primary amine itself is reacted at room temperature with thionyl chloride, the following reaction occurs:

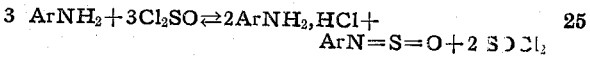
$$3\ ArNH_2 + 3Cl_2SO \rightleftarrows 2ArNH_2,HCl + ArN=S=O + 2SOCl_2$$

When the temperature is raised, HCl is given off and the amine hydrochloride is also gradually converted into its thionyl derivative.

Because of these equilibria it makes little difference of the new process is started from the amine hydrochloride and thionyl chloride or from the base and thionyl chloride or from the thionylamine. In the first two cases the amine or its hydrochloride is gradually converted into a thionyl compound which reacts with sulfur monochloride forming the thiazthionium salt; the reaction of the amine or its hydrochloride with thionyl chloride apparently has a greater velocity than this reaction with sulfur monochloride. In each case the thiazthionium chloride formed is not changed back and therefore the equilibrium is upset and the reaction proceeds to completion.

If the reaction is started from the thionylamine at higher temperature when most of the HCl formed by the reaction is given off, a slow stream of HCl gas has a distinct catalytic effect, probably forming the unstable intermediate $ArNH.SO.Cl$. At lower temperatures, where the excess hydrochloric acid is still present in the reaction mixture, it is not necessary to add any hydrochloric acid. The reaction temperature will vary with the particular thiazthionium compound produced but should not normally exceed 120° C. The relative amounts of sulfur monochloride and thionyl chloride may also be varied although at least 1 mol. of each must be present. An excess of either, however, frequently raises the yield or improves the quality.

The invention is not limited to any particular theory but we believe that one of the reasons why the present process gives purer products in better yields is that the thionylamines are soluble in sulfur monochloride and also in the customary inert solvents, whereas the amine hydrochlorides are not and the reaction is therefore facilitated. It is possible that other factors also enter in and the invention is, of course, in no sense limited to the above theory of the process which is advanced purely as a possible hypothesis.

The present invention produces thiazthionium chlorides of higher purity. Thus, the thiazthionium chlorides prepared according to the present invention are completely soluble in ice water, leaving only small amounts of sulfur undissolved, whereas the corresponding compound prepared by the old method with sulfur monochloride alone are much darker and frequently, in addition to large amounts of sulfur, leave tarry residues when dissolved in ice water. Catalysts such as glacial acetic acid are also eliminated, which is a further advantage over the prior art. Not only are the thiazthionium salts purer which are produced by the present invention, but they are more easily filtered and the process is simplified in that it is possible to start with the amine itself instead of with a hydrochloride which was necessary in the old process and in fact we prefer to start with the amine.

The present invention can be applied generally to various primary aromatic monoamines such as aniline, the toluidines, particularly orthotoluidine, xylindines, phenetidines, such as paraphenetidine, naphthylamines, such as betanaphthylamine, and primary diamines such as benzidine, dianisidine, paraphenylenediamine and the like. If desired, the reaction may be carried out in the presence of inert solvents or diluents such as ethylenedichloride, orthodichlorobenzene, carbon tetrachloride, etc. Where sulfur monochloride is used in excess, it may replace the diluent partly or wholly.

The invention will be described in greater detail in the following specific examples which illustrate the application of the invention to the preparation of typical thiazthionium products. The examples relate to the chlorides as these are commercially the most important, but it should be understood of course that the corresponding bromides may be prepared by using $S_2Br_2$ and either thionyl chloride or bromide. In the examples, parts are by weight.

*Example 1*

34.3 parts of paraphenetidine are slowly added to an equimolecular quantity of thionyl chloride in 150 parts of ethylene chloride, the mixture being stirred and cooled during the addition. Thereupon an equimolecular quantity of sulfur monochloride is added, the mixture heated to 60–65° C. and stirred at that temperature for 20 hours. The ethoxyphenthiazthionium chloride produced is filtered with suction at room temperature, washed with ethylene chloride and dried at 65° C. under reduced pressure. The yellow crystalline product consists of the pure thiazthionium chloride with a trace of sulfur. The yield is 85% of the theoretical. This yield proves the correctness of the equations of the new process. If a small excess of either thionyl chloride or sulfur monochloride is used, for example 50%, the yields are almost quantitative. The solvent recovery is facilitated by the absence of any large excess of $S_2Cl_2$.

*Example 2*

17.5 parts of sulfur monochloride are dissolved in 40 parts of orthodichlorbenzene, heated to 80–85° C., stirred and a slow stream of dry HCl passed in. 22.9 parts of thionylparaphenetidine dissolved in 40 parts of orthodichlorbenzene are gradually added during two hours and the stirring and heating are continued until a test shows no unreacted thionyl compound. The reaction product separates out in beautiful yellow crystals which are filtered with suction and washed with benzene. The crystals are completely soluble in ice water and contain no free sulfur.

*Example 3*

A solution of 169 parts of sulfur monochloride, 31 parts of thionyl chloride and 40 parts of orthodichlorbenzene are stirred at room temperature and 32.4 parts of finely ground dry aniline hydrochloride are added at room temperature. The mixture is then heated slowly to 65° and stirred at that temperature for about 22 hours. A yellow product is obtained which is filtered with suction and washed with benzene. The 6-chloro-phenthiazthionium chloride is obtained in better yield and much purer form than when the thionylchloride is omitted.

*Example 4*

35.9 parts of finely ground dry orthotoluidine hydrochloride are added with stirring to a solution of 31 parts of thionyl chloride in 251 parts of sulfur monochloride at room temperature. The mixture is heated slowly to 35° C. and is stirred at that temperature for about 24 hours whereupon the temperature is raised to 45° and the stirring continued for another 24 hours at this temperature. The yellow thiazthionium chloride is filtered off and washed with benzene.

*Example 5*

35.8 parts of betanaphthylamine are slowly added with stirring and cooling to a solution of 31 parts of thionyl chloride and 53 parts of orthodichlorbenzene. Thereupon 169 parts of sulfur monochloride are added and the mixture stirred, heated to 65° C. and stirred at that temperature for 19 hours. The bright red naphthiazthionium chloride is filtered out after the solution has cooled to room temperature and is washed with benzene.

*Example 6*

23 parts of finely ground benzidine are added gradually to a solution of 31 parts of thionyl chloride in 159 parts of orthodichlorbenzene. The mixture is warmed gently to ensure complete reaction and then 169 parts of sulfur monochloride are added after cooling. After all of the sulfur monochloride has been added, the mixture is heated up to 100° C. and stirred at that temperature for 16 hours. The mixture is then cooled and the thiazthionium salt filtered with suction and washed with benzene.

We claim:

1. A method of preparing thiazthionium chlorides which comprises reacting a primary aromatic amine having at least one hydrogen ortho to the amino group, with thionyl chloride and causing the resulting product to react with sulfur monochloride, the thionylchloride and sulfur monochloride being present in amounts equal to at least 1 mol. for each mol. of the amine.

2. A method of preparing thiazthionium chlorides which comprises reacting a mixture containing as a major component an aromatic thionylamine having at least one hydrogen ortho to the amino group and substantially free from other reactive components, with sulfur monochloride in the presence of hydrogen chloride as a catalyst.

3. A method of preparing thiazthionium chlorides which comprises reacting a primary aromatic amine hydrochloride having at least one hydrogen ortho to the amino group, with thionyl chloride and sulfur monochloride in such amounts that there is present at least 1 mol. of each for each mol. of amine.

4. A method according to claim 1 in which the reaction is carried out in an inert organic solvent.

4. A method according to claim 8 in which the reaction is carried out in an inert organic solvent.

6. A method according to claim 2 in which the reaction is carried out in an inert organic solvent.

7. A method according to claim 3 in which the reaction is carried out in an inert organic solvent.

8. A method of preparing thiozthionium chlorides which comprises bringing about reaction between sulfur monochloride and a mixture containing a major component included in the group consisting of aromatic thionylamines having at least one hydrogen ortho to the amino group, reaction mixtures of the corresponding amine hydrochloride and thionyl chloride, and reaction mixtures of the corresponding amine and thionyl chloride, the mixture reacting with the sulfur monochloride being substantially free from reactive compounds not included in the above group.

9. A method according to claim 8 in which the aromatic thionylamine is an aromatic monothionylamine (ArN=S=O).

10. A method according to claim 8 in which the aromatic amine is an aromatic dithionylamine

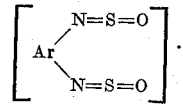

11. A method according to claim 8 in which the aromatic thionylamine is thionylparaphenetidine, the amine hydrochloride is paraphenetidine hydrochloride and the amine is paraphenetidine.

12. A method according to claim 8 in which the aromatic amine is thionyl beta-naphthylamine, the amine hydrochloride is beta-naphthylamine hydrochloride and the amine is beta-naphthylamine.

WENDELL P. MUNRO.
HANS Z. LECHER.